United States Patent
Makal

(10) Patent No.: US 10,294,323 B2
(45) Date of Patent: May 21, 2019

(54) MOISTURE VAPOR TRANSMISSION THERMOPLASTIC POLYURETHANE WITH HIGH HEAT RESISTANCE

(71) Applicant: Lubrizol Advanced Materials, Inc., Cleveland, OH (US)

(72) Inventor: Umit G. Makal, Slow, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/502,214

(22) PCT Filed: Aug. 11, 2015

(86) PCT No.: PCT/US2015/044556
§ 371 (c)(1),
(2) Date: Feb. 7, 2017

(87) PCT Pub. No.: WO2016/025423
PCT Pub. Date: Feb. 18, 2016

(65) Prior Publication Data
US 2017/0226265 A1    Aug. 10, 2017

Related U.S. Application Data

(60) Provisional application No. 62/035,544, filed on Aug. 11, 2014.

(51) Int. Cl.
| | | |
|---|---|---|
| C08G 18/32 | (2006.01) | |
| C08G 18/48 | (2006.01) | |
| C08G 18/76 | (2006.01) | |
| C09J 175/08 | (2006.01) | |
| C08G 18/66 | (2006.01) | |
| C09J 5/00 | (2006.01) | |
| C09J 7/02 | (2006.01) | |

(52) U.S. Cl.
CPC ..... *C08G 18/3218* (2013.01); *C08G 18/4825* (2013.01); *C08G 18/4833* (2013.01); *C08G 18/6607* (2013.01); *C08G 18/7657* (2013.01); *C08G 18/7671* (2013.01); *C09J 5/00* (2013.01); *C09J 7/02* (2013.01); *C09J 175/08* (2013.01); *C09J 2475/00* (2013.01)

(58) Field of Classification Search
CPC . C08G 18/3218; C08G 18/6505; C09J 175/08
See application file for complete search history.

(56) References Cited

U.S. PATENT DOCUMENTS

| | | | | |
|---|---|---|---|---|
| 2,945,008 | A * | 7/1960 | Caldwell | C08G 18/3218 521/174 |
| 4,039,517 | A * | 8/1977 | Hamamura | C08G 18/0819 528/45 |
| 4,587,352 | A * | 5/1986 | Masaoka | C08F 299/065 526/266 |
| 2003/0092832 | A1 * | 5/2003 | Tanaka | C08G 18/12 524/589 |
| 2006/0269758 | A1 * | 11/2006 | Helmeke | A41D 31/02 428/423.1 |
| 2012/0252958 | A1 * | 10/2012 | Yagi | C08G 18/0823 524/507 |

OTHER PUBLICATIONS

Machine Translation of JP 11-043662 (Year: 2018).*

* cited by examiner

*Primary Examiner* — Michael M Dollinger
(74) *Attorney, Agent, or Firm* — Eryn Ace Fuhrer; Teresan W. Gilbert

(57) ABSTRACT

The present invention relates to novel thermoplastic polyurethanes (TPU) that contain alkylene substituted spirocyclic compounds. The present invention provides for TPU which exhibit high temperature resistance.

13 Claims, No Drawings

MOISTURE VAPOR TRANSMISSION THERMOPLASTIC POLYURETHANE WITH HIGH HEAT RESISTANCE

CROSS REFERENCE TO RELATED APPLICATION

This application claims priority from PCT Application Serial No. PCT/US2015/044556 filed on Aug. 11, 2015, which claims the benefit of U.S. Provisional Application No. 62/035,544 filed on Aug. 11, 2014, the entirety of both of which is hereby incorporated by reference.

FIELD OF THE INVENTION

The present invention relates to thermoplastic polyurethanes (TPU) which can be used in articles that require a high heat moisture vapor transmission and particularly TPU that can be used in adhesive films or tapes or compositions for the construction of an article such as for example a garment.

BACKGROUND OF THE INVENTION

The use of polyurethanes, including thermoplastic polyurethanes (TPU) in adhesives or in films for high moisture vapor transmission with different substrates, including fabrics, is known. These TPU containing adhesive and film systems can vary in both thermal and physical properties due to the properties of the TPU used in the systems. The state of the art shows several needs for TPU adhesives and films which can have a different melt profile than the current state of the art. Some of these needs include, for example, TPU compositions which can be used at high temperatures or processed at higher temperatures. The temperature limit in the use of TPU compositions as either an adhesive or as a high moisture vapor transmission membrane produce operating inefficiencies during the manufacturing of textile laminates or in the use of adhesives in the construction, embellishment or waterproofing of garments. Thus, there is a general need in the state of the art for TPU compositions that can be used in adhesive systems or high temperature moisture vapor transmission films which exhibit high temperature resistance during the manufacture or in use conditions, while maintaining other physical properties.

SUMMARY OF THE INVENTION

The present invention provides a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyether polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further relates to a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, and (4) an additional aliphatic polyisocyanate and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further provides a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, and (4) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further provides a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, (4) an additional aliphatic polyisocyanate, and (5) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further discloses a process of making the TPU, comprising the steps of: (a) reacting (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyether polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine; (b) extruding the thermoplastic polyurethane obtained in step (a) into a hot extruded tube; and (c) cooling the hot extruded tube to below the melting point of the thermoplastic polyurethane composition to produce an extruded thermoplastic polyurethane.

The present invention further discloses an article which comprises the described TPU.

The invention also provides an adhesive film or tape or composition comprising the disclosed TPU.

The invention further discloses a method of bonding at least two components together which comprises applying the disclosed adhesive film or tape or composition between the components to be bonded.

DETAILED DESCRIPTION OF THE INVENTION

The process to make the thermoplastic polyurethane (TPU) of this invention includes a reaction with an alkylene substituted spirocyclic compound. The obtained TPU exhibits a significant increase in heat resistance and operating efficiency at the production of adhesives. In one aspect, the TPU of the present invention includes the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyether polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. The technique under which these reactants are polymerized to synthesize the TPU may be conducted utilizing conventional processing equipment, catalysts, and processes. However, the polymerization is conducted in a manner that will result in the desired polymer characteristics or properties. The types and levels of aromatic polyisocyanate, polyether polyol and alkylene substituted spirocyclic compound comprising an alkylene substituted saturated spirocyclic-diol, an alkylene substituted saturated spirocyclic-diamine, or a combination thereof will be adjusted to attain the desired set of chemical and physical characteristics for the polymer being synthesized. The polymerization techniques useful in making the TPU of this invention include conventional methods, such as reactive extrusion, batch processing, solution polymerization, and cast polymerization.

In one embodiment, the aromatic polyisocyanate used in synthesizing the thermoplastic polyurethane can be selected from an aromatic diisocyanate. Moreover, the use of multifunctional isocyanate compounds, i.e., triisocyanates, etc., which cause undesirable premature crosslinking, are generally avoided and thus the amount used, if any, is generally less than 4 mole percent in one aspect, and less than 2 mole percent in another aspect, based upon the total moles of all of the various isocyanates used.

In one embodiment, the aromatic diisocyanates is 4,4'-methylenebis(phenyl isocyanate) (MDI), m-xylylene diisocyanate (XDI), phenylene-1,4-diisocyanate, naphthalene-1, 5-diisocyanate (NDI), diphenylmethane-3,3'-dimethoxy-4, 4'-diisocyanate, or toluene diisocyanate (TDI). In some embodiments, the aromatic diisocyanate is MDI. Dimers and trimers of the above diisocyanates may also be used as well as a blend of two or more diisocyanates may be used.

The aromatic polyisocyanate used in this invention may be in the form of a low molecular weight polymer or oligomer which is end capped with an aromatic isocyanate. For example, the alkylene substituted spirocyclic compound may be reacted with an isocyanate-containing compound to create a low molecular weight polymer end capped with the aromatic isocyanate. In the TPU art, such materials are normally referred to as pre-polymers. Such pre-polymers normally have a number average molecular weight (Mn) which is within the range of about 500 to about 10,000.

The mole ratio of the one or more aromatic diisocyanates is generally from about 0.95 to about 1.05 in one aspect, and from about 0.98 to about 1.03 moles per mole in another aspect, of the total moles of the alkylene substituted spirocyclic compound.

In one embodiment, the alkylene substituted spirocyclic compound comprises an alkylene substituted saturated spirocyclic-diol, an alkylene substituted saturated spirocyclic-diamine, or a combination thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In one embodiment, the alkylene substituted spirocyclic compound is a spiroheterocycle containing 2 heteroatoms in each ring, and the heteroatoms are oxygen, nitrogen, sulfur or phosphorous. In one embodiment, the alkylene substituted spirocyclic compound is a spiroheterocycle containing 2 heteroatoms in each ring and the heteroatoms are oxygen or nitrogen. In one embodiment, the alkylene substituted spirocyclic compound is a spiroheterocycle containing 2 heteroatoms in each ring and the heteroatoms are oxygen.

In one embodiment, the alkylene substituted spirocyclic compound shows a structural formula:

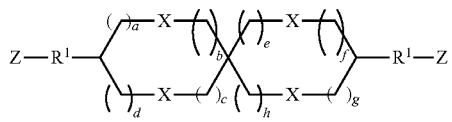

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3. In one embodiment, a is equal to g, b is equal to h, c is equal to e and d is equal to f. In one embodiment, all X are identical. In one embodiment, all X are identically selected from O or $NR^2$, wherein $R^2$ represents a hydrogen atom or an alkyl group containing from 1 to about 6 carbon atoms, a is equal to g, b is equal to h, c is equal to e and d is equal to f. In one embodiment, the spirocyclic-dialkylene compound contains two 6-membered ring, X is independently selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is identically selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is O, $R^1$ is 1,1-dimethylethyl, Z is —OH, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

In one embodiment, the alkylene substituted spirocyclic compound shows a structural formula:

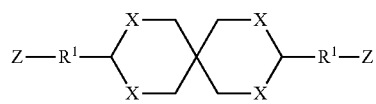

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms. In one embodiment, X is identically selected from O, $CHR^2$, $NR^2$, S, $PR^2$, wherein each $R^2$ represents a hydrogen atom or an alkyl group containing from 1 to about 6 carbon atoms. In one embodiment, X is O, $R^1$ is 1,1-dimethylethyl, and Z is —OH.

In one embodiment, the polyether polyol is a polyether polyol or a copolymeric polyether polyol or mixtures of polyether polyols and/or copolymeric polyether polyols. In one embodiment, the copolymeric polyether polyol is a copolymer of polyether polyol and a polyol selected from polyester polyol, polycarbonate polyol, polycaprolactone polyol or polyamide polyol. In one embodiment, the copolymeric polyether polyol contains at least 50%, at least 60%, at least 70%, or at least 80% of polyether polyol. In other embodiments, the polyether polyol is substantially free, or even completely free of copolymeric polyether polyol.

In one embodiment, the polyether polyol or the polyether polyol in the copolymeric polyether polyol is derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene) glycol comprising ethylene oxide reacted with ethylene glycol, poly(propylene) glycol comprising propylene oxide reacted with propylene glycol, poly(tetramethylene ether) glycol comprising water reacted with tetrahydrofuran which can also be described as polymerized tetrahydrofuran, and which is commonly referred to as PTMEG or polypropylene-ethylene) glycol. In some embodiments, the polyether polyol is polyethylene glycol (PEG). Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether polyols generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether polyol includes a blend of two or more different molecular weight polyethers, such as a blend of 1,000 Mn and 1,450 Mn PEG.

Suitable polyester polyols in the copolymeric polyether polyol include polyester polyols produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. In some embodiments, the polyester polyol is a linear polyester polyol having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable polycarbonate polyols in the copolymeric polyether polyol include the reaction product of at least one carbonate and a glycol. U.S. Pat. No. 4,131,731 is hereby incorporated by reference for its disclosure of polycarbonate polyols and their preparation. Such polycarbonates are linear and have terminal hydroxyl groups with essential exclusion of other terminal groups. The essential reactants are glycols and carbonates. Suitable glycols are cycloaliphatic or aliphatic diols, and suitable carbonates are alkylene carbonates. Suitable cycloaliphatic or aliphatic diols are selected from cycloaliphatic and aliphatic diols containing 4 to 40, and or even 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, 2,2, 4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1, 3, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable alkylene carbonates are selected from alkylene carbonates composed of a 5 to 7 member ring. Suitable carbonates for use herein include ethylene carbonate, trimethylene carbonate, tetramethylene carbonate, pentamethylene carbonate, hexamethylene carbonate, heptamethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate. In one embodiment, the polycarbonate polyol is selected from poly(heptamethylenecarbonate) diol, poly(hexamethylenecarbonate) diol, poly(pentamethylenecarbonate)diol, poly(tetramethylenecarbonate)diol, poly(pentamethylene-co-hexamethylenecarbonate)diol or poly(tetramethylene-co-hexamethylenecarbonate)diol or combinations thereof.

Suitable polycaprolactone polyols in the copolymeric polyether polyol include one or more polycaprolactone polyols. The polycaprolactone polyols useful in the technology described herein include polyester diols derived from caprolactone monomers. The polycaprolactone polyols are terminated by primary hydroxyl groups. Suitable polycaprolactone polyols may be made from ε-caprolactone and a bifunctional initiator such as diethylene glycol, 1,4-butanediol, or any of the other glycols and/or diols listed herein. Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyol is linear. In some embodiments, the polycaprolactone polyol is prepared from 1,4-butanediol. In some embodiments, the polycaprolactone polyol has a number average molecular weight from 500 to 10,000, or from 500 to 5,000, or from 1,000 or even 2,000 to 4,000 or even 3,000.

Suitable polyamide polyols in the copolymeric polyether polyol include telechelic polyamide polyols, low molecular weight polyamide oligomers and telechelic polyamides (including copolymers) that include N-alkylated amide groups in the backbone structure. The term polyamide oligomer refers to an oligomer with two or more amide linkages, or sometimes the amount of amide linkages will be specified. In some embodiments, the polyamide oligomer is a species below 20,000 g/mole molecular weight, below 10,000; 5,000; 2,500; or 2,000 g/mole that has two or more amide linkages per oligomer. A subset of polyamide oligomers are telechelic polyamides.

In one embodiment, the polyamide polyol is a telechelic polyamide. Telechelic polyamides are polyamide oligomers with specified percentages of two functional groups of a single chemical type. Ranges for the percent difunctional that are preferred to meet the definition of telechelic are at least 70 or 80. The telechelic polyamide can comprise: (a) two functional end groups selected from hydroxyl, carboxyl, or primary or secondary amine; and (b) a polyamide segment wherein: (i) said polyamide segment comprises at least two amide linkages characterized as being derived from reacting an amine with a carboxyl group; (ii) said polyamide segment comprises repeat units derived from polymerizing two or more monomers selected from the group consisting of lactam monomers, aminocarboxylic acids monomers, dicarboxylic acids monomers, and diamine monomers. The telechelic polyamide, in some embodiments, may be characterized as a liquid with a viscosity of less than 100,000 cps at 70° C. as measured by a Brookfield circular disc viscometer with the circular disc spinning at 5 rpm. In some embodiments, the telechelic polyamide is characterized by a weight average molecular weight from about 200 to 10,000 g/mole and comprises a diversity of amide forming repeating units disrupting hydrogen bonding between amide components.

In another aspect, the present invention further refers to a TPU which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, and (4) an additional aliphatic polyisocyanate and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

In one embodiment, the aliphatic diisocyanates is isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (IPDI), 3,3'-Dimethyl-4,4'-biphenylene diisocyanate (TODI), and dicyclohexylmethane-4,4'-diisocyanate (H12MDI). Mixtures of two or more diisocyanates may be used. In some embodiments, the aliphatic isocyanate is H12MDI. In some embodiments, the aromatic polyisocyanate includes MDI and the aliphatic polyisocyanate includes H12MDI. In some embodiment, the polyisocyanate component of the invention is essentially free of, or even completely free of, hexamethylene diisocyanate (HDI). Dimers and trimers of the above diisocyanates may also be used as well as a blend of two or more diisocyanates may be used.

In another aspect, the present invention further relates to a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, and (4) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

In one embodiment, the additional chain extender is an aliphatic or cycloaliphatic diamine or glycol having from 2 to 20, or 2 to 12, or 2 to 10 carbon atoms, or combinations thereof. Suitable examples include ethylene glycol, diethylene glycol, propylene glycol, dipropylene glycol, 1,3-propanediol, 1,4-butanediol (BDO), 1,6-hexanediol (HDO), 1,3-butanediol, 1,5-pentanediol, neopentylglycol, 1,4-cyclohexanedimethanol (CHDM), hexamethylenediol, heptanediol, nonanediol, dodecanediol, 2-ethyl-1,3-hexanediol, 2,2,4-trimethyl pentane-1,3-diol, 1,4-cyclohexanedimethanol, 3-methyl-1,5-pentanediol, ethylenediamine, butanediamine, hexamethylenediamine, and the like, as well as mixtures thereof. In some embodiments the additional chain extender includes BDO, HDO, 3-methyl-1,5-pentanediol, or a combination thereof. In some embodiments, the additional chain extender includes BDO. Other glycols, such as aromatic glycols or diamines, like for example resorcinol bis(2-hydroxyethyl) ether (HER) or 2,2-bis[4-(2-hydroxyethoxy)phenyl]propane (HEPP), could be used, but in some embodiments the TPUs described herein are essentially free of or even completely free of such materials.

In another aspect, the present invention further provides a thermoplastic polyurethane (TPU) which comprises the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, (3) a polyether polyol, (4) an additional aliphatic polyisocyanate, and (5) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

In another aspect, the present invention further discloses a process of making the TPU compositions, comprising the steps of: (a) reacting (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyether polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine; resulting in a TPU with high heat moisture vapor transmission rate; (b) extruding the thermoplastic polyurethane obtained in step (a) into a hot extruded tube; and (c) cooling the hot extruded tube to below the melting point of the thermoplastic polyurethane composition to produce an extruded thermoplastic polyurethane.

Alternatively, in one embodiment, the reaction in step (a) further includes (4) an additional aliphatic polyisocyanate. Alternatively, in one embodiment, the reaction in step (a) further includes (5) an additional chain extender. Alternatively, in one embodiment, the reaction in step (a) further includes (4) an additional aliphatic polyisocyanate and (5) an additional chain extender.

The process to produce the TPU polymer of this invention can utilize conventional TPU manufacturing equipment. The aromatic polyisocyanate, the alkylene substituted spirocyclic compound and the polyether polyol, and the optional additional aliphatic polyisocyanate disclosed hereinabove are generally added together and reacted in accordance with standard polyurethane synthesis methodology. The TPU forming components of the present invention can be melt polymerized in a suitable mixer, such as an internal mixer known as a Banbury mixer, or in an extruder. In one process, the optional additional aliphatic polyisocyanate is blended with the aromatic polyisocyanate. In one process, the polyisocyanate or blend of polyisocyanates is added separately to the extruder. Suitable processing or polymerization starting temperatures of the polyisocyanate are from about 100° C. to about 200° C. in one aspect, and from about 100° C. to about 150° C. in another aspect. Suitable processing or polymerization starting temperatures of the blend of the alkylene substituted spirocyclic compound and the polyether polyol are from about 100° C. to about 220° C. in one aspect, and from about 150° C. to 200° C. in a further aspect. Suitable mixing times in order to enable the various components to react and form the TPU polymers of the present invention are generally from about 2 to about 10 minutes in one aspect, and from about 3 to about 5 minutes in another aspect.

It is often desirable to utilize catalysts such as stannous and other metal carboxylates as well as tertiary amines. Examples of metal carboxylate catalysts include stannous octoate, dibutyltin dilaurate, phenyl mercuric propionate, lead octoate, iron acetylacetonate, magnesium acetylacetonate, and the like. Examples of tertiary amine catalysts include triethyleneamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 60,000 to about 600,000 Daltons in one aspect, from about 100,000 to about 300,000 Daltons in another aspect, and from about 120,000 to about 250,000 Daltons in a further aspect. The Mw of the TPU polymer is measured according to gel permeation chromatography (GPC) against polystyrene standard.

The TPU polymers of the present invention can be mixed with various conventional additives or compounding agents, such as antioxidants, biocides, fungicides, antimicrobial agents, anti-static additives, plasticizers, fillers, extenders, flame retardants, impact modifiers, pigments, lubricants, mold release agents, rheology modifiers, UV absorbers, and the like. The level of conventional additives will depend on the final properties and cost of the desired end-use application, as is well known to those skilled in the art of compounding TPUs. These additional additives can be incorporated into the components of the reaction mixture for the preparation of the TPU, or after making the TPU. In another process, all the materials can be mixed with the TPU and then melted or they can be incorporated directly into the melt of the TPU.

In another aspect, the present invention refers to an article comprising the TPU of the present invention.

In another aspect, the present invention refers to an adhesive tape or film which comprises the TPU of the present invention.

In another aspect, the present invention refers to a method of bonding at least two components together which comprises applying the adhesive film or tape or composition comprising the disclosed TPU between the components to be bonded.

The disclosed technology solves the problem of low temperature limits in the use of TPU compositions as adhesives for films producing operating inefficiencies at the production lines of films.

Furthermore, the disclosed technology may provide an improved heat resistance for films, fabrics or garments comprising TPU. The disclosed technology is also a solution to the problem of films, fabrics or garments used under high temperature environments.

In one embodiment, the articles containing the disclosed TPU include fabrics and garments. The garment types include intimates, outerwear and sportswear. In one embodiment, the article is coated, impregnated or otherwise treated with the TPU of this invention. In one embodiment, the fabrics are used in the manufacture of garments, and the fabrics include intimates, outerwear, sportswear, medical garments, diapers, bedding articles or sport equipment.

Intimates, such as bras, panties, underwear, camisoles, body shapers, nightgowns, panty hose, men's undershirts, tights, socks and corsetry can benefit from the properties of the TPU of the invention. Outerwear articles, such as shirts, T-shirts, tights, gloves, uniforms and workwear are also among the articles of the invention. An additional embodiment refers to sportswear, such as shorts, including biking, hiking, running, compression, training, golf, baseball, basketball, cheerleading, dance, soccer and/or hockey shorts; shirts and T-shirts, including any of the specific types listed for shorts above; tights including training tights and compression tights; swimwear including competitive and resort swimwear; bodysuits including wrestling, running and swimming body suits; and footwear. Medical garments and articles include hosiery such as compression hosiery, diabetic socks, static socks, and dynamic socks; therapeutic burn treatment bandages and films; and wound care dressings. Bedding articles such as pajamas, sleeping bags, sheets, blankets, comforters, mattress pads, mattress tops, and pillow cases can also benefit from the properties of the TPU of the invention. Sport equipment such as boxing gloves, helmets, handles or grips of rackets or bicycles, sleeping bags, tents, cushion covers on seats on boats, cars or bicycles, or covers on steering wheels of a boat and the like are also among the articles of the invention.

In other embodiments, the articles of this invention are fabrics and may be applied in fire retardant and thermal insulating materials and include for example clothing, boot and shoe liners, fire protection blankets or garments. These fabrics can be used to produce garments well suited for being worn by those in the military or garments worn by firefighters and other security personnel, and garments worn in industrial settings. These garments may include shirts, pants, bib overalls, socks and other leg wear, gloves, scarves, hats, helmets, face shields, vests, chaps, jackets, coats, aprons, waders, boots, shoes, and the like.

In other embodiments, the disclosed adhesive film or tape or composition of the invention are car cushion covers, car steering wheels or car seats, which show fire retardant properties as well as breathability.

In still other embodiments, the articles containing the various composition described above include any article that will be exposed to high temperatures during its use, and especially such articles which have not been made using thermoplastic polyurethanes in the past because of such materials having insufficient high temperature resistance or performance.

The present technology also includes the use of an alkylene substituted spirocyclic compound comprising an alkylene substituted saturated spirocyclic-diol, an alkylene substituted saturated spirocyclic-diamine, or a combination thereof, and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine to improve the heat resistance of a thermoplastic polyurethane (TPU), where in some embodiments, the heat resistance is measured by measuring the modulated differential scanning calorimetry (MDSC). These uses include using an alkylene substituted spirocyclic compound comprising an alkylene substituted saturated spirocyclic-diol, an alkylene substituted saturated spirocyclic-diamine, or a combination thereof, and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine in the preparation of a TPU. In some embodiments the TPU is also prepared from an aromatic polyisocyanate and a polyether polyol. Any of the TPU materials described above may be used in these uses.

Various preferred features and embodiments will be described below by way of non-limiting illustration.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

EXAMPLES

Examples 1-8

The polyisocyanate, the polyol and the chain extender are pre-heated separately to 120° C. at ambient pressure (20 min.) Then, the components are mixed in a reaction vessel placed on a hot plate for about 3 minutes. In these examples, a typical aromatic polyisocyanate is 4,4'-methylenebis(phenyl isocyanate) (MDI) and typical polyols are polyether polyols PEG1000 or PEG1450. Chain extenders of these examples are alkylene substituted spirocyclic compounds, a typical alkylene substituted spirocyclic compound in these examples is 2,2'-(2,4,8,10-tetraoxaspiro[5,5]undecane-3,9-diyl)bis(2-methylpropan-1-ol) (PSG). Chain extender in the comparative examples 1, 2 and 4 is 1,4-butanediol (BDO). Other polyisocyanates, polyols and alkylene substituted spirocyclic compounds as chain extenders disclosed in the description could also be used in the preparation of these examples. The resulting material is aged for two hours at 105° C.

TABLE 1

| Component (mole) | Example No. | | | | | | | |
|---|---|---|---|---|---|---|---|---|
| | 1 COMP | 2 COMP | 3 INV | 4 COMP | 5 INV | 6 INV | 7 INV | 8 INV |
| Polyisocyanate | MDI | MDI | MDI | MDI | MDI | MDI | MDI | MDI |
| Polyol | PEG 1000 | PEG 1000 | PEG 1000 | PEG 1450 | PEG 1450 | PEG 1450 | PEG 1450 | PEG 1450 |
| Chain extender | BDO | BDO | SPG | BDO | PSG | PSG | PSG | PSG |
| MDSC Tg ($1^{st}$ reversible heat flow), ° C. | −12 | −11 | — | −11 | −33 | −37 | −37 | −34 |
| MDSC Tm ($1^{st}$ reversible heat flow), ° C. | 153 | 155 | — | 150 | 219 | 208 | 188 | 201 |

Modulated Differential Scanning calorimetry (MDSC) measurements are carried out for comparative and inventive samples. The heating rate in a regular DSC measurement is linear, MDSC applies an additional and sinusoidally changing heating rate on top of a linear heating rate. This way the total heat flow is broken into two parts; heat flow that responds to changing heating rate and heat flow that does not respond to changing heating rate. In general only heat capacity and melting transitions are responsive to the changing heating rate. As a result, the total heat flow is broken into reversible and non-reversible heat flows. The reversible heat flow is the heat capacity component (glass transition and most melting transitions) and the non-reversible heat flow is the kinetic component (enthalphic recovery, crystallization, thermosetting, etc. . . . ). This way the thermodynamic transitions can be separated from kinetic transitions, i.e., a potential overlap of enthalphic recovery with glass transition or melting transition due to the left over stress or orientation in a TPU network can easily be separated resulting in detection of true Tg and Tm. In Table 1, Tg and Tm transitions from the $1^{st}$ reversible heat flow curve are reported. We are interested in the melting point increase of the inventive breathable TPU networks over the comparative samples with keeping the amount of the poly(ethylene glycol) soft segment content the same. The significant increase in the melting point for the inventive samples clearly suggests improved heat resistance for these inventive formulations compared to comparative one.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

All molecular weight values provided herein are weight average molecular weights unless otherwise noted. All molecular weight values have been determined by GPC analysis unless otherwise noted.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:
1. A thermoplastic polyurethane (TPU) comprising the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyol consisting of polyethylene glycol or combinations thereof, and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

2. The thermoplastic polyurethane of claim 1, wherein it further comprises an aliphatic polyisocyanate.

3. The thermoplastic polyurethane of claim 1, wherein the alkylene substituted spirocyclic compound is a spiroheterocycle containing 2 heteroatoms in each ring, where the heteroatoms are oxygen, nitrogen, sulfur or phosphorous.

4. The thermoplastic polyurethane of claim 1, wherein the structural formula of the alkylene substituted spirocyclic compound is:

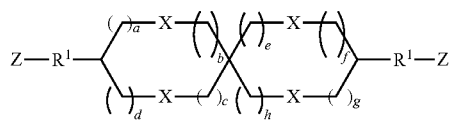

wherein each X is selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3.

5. The thermoplastic polyurethane of claim 4, wherein a is equal to g, b is equal to h, c is equal to e and d is equal to f.

6. The thermoplastic polyurethane of claim 1, wherein the structural formula of the spirocyclic-dialkylene compound is:

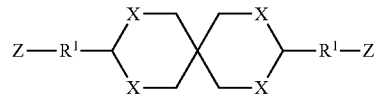

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms.

7. The thermoplastic polyurethane of claim 4, wherein the spirocyclic-dialkylene compound contains two 6-membered ring, X is O, $R^1$ is 1,1-dimethylethyl, Z is OH, and where either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

8. The thermoplastic polyurethane of claim 5 wherein X is O, $R^1$ is 1,1-dimethylethyl, and Z is —OH.

9. The thermoplastic polyurethane of claim 1, wherein the aromatic polyisocyanate is 4,4'-methylenebis(phenyl isocyanate).

10. A process of making a thermoplastic polyurethane (TPU) comprising the steps of: (a) reacting (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polyol consisting of polyethylene glycol, or combinations thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine; (b) extruding the thermoplastic polyurethane obtained in step (a) into a hot extruded tube; and (c) cooling the hot extruded tube to below the melting point of the thermoplastic polyurethane composition to produce an extruded thermoplastic polyurethane.

11. An article comprising a thermoplastic polyurethane (TPU), according to claim 1.

12. An adhesive composition which comprises a thermoplastic polyurethane (TPU), according to claim 1.

13. A method of bonding at least two components together which comprises applying the adhesive composition of claim 12 between the components to be bonded.

* * * * *